United States Patent
Burke

(10) Patent No.: US 6,704,816 B1
(45) Date of Patent: Mar. 9, 2004

(54) METHOD AND APPARATUS FOR EXECUTING STANDARD FUNCTIONS IN A COMPUTER SYSTEM USING A FIELD PROGRAMMABLE GATE ARRAY

(75) Inventor: David Burke, Morpeth (GB)

(73) Assignee: Sun Microsystems, Inc., Santa Clara, CA (US)

(*) Notice: Subject to any disclaimer, the term of this patent is extended or adjusted under 35 U.S.C. 154(b) by 438 days.

(21) Appl. No.: 09/625,579

(22) Filed: Jul. 25, 2000

(51) Int. Cl.[7] .............................................. G06F 13/00
(52) U.S. Cl. ..................... 710/100; 716/16; 711/103; 708/231; 708/232
(58) Field of Search .................. 710/62, 100, 316, 710/306; 712/1, 23; 713/320; 763/23–28; 395/800, 500; 326/62, 38, 41, 44; 340/825–825.98; 716/16, 4.16; 709/222; 711/103; 708/231, 232; 714/724, 725; 717/136

(56) References Cited

U.S. PATENT DOCUMENTS

| | | | |
|---|---|---|---|
| 4,503,511 A | * 3/1985 | Vandierendonck | 708/231 |
| 4,578,771 A | * 3/1986 | O'Hara, Jr. | 708/232 |
| 4,791,603 A | * 12/1988 | Henry | 326/38 |
| 4,870,302 A | * 9/1989 | Freeman | 326/41 |
| 4,967,107 A | * 10/1990 | Kaplinsky | 326/44 |
| 5,317,698 A | * 5/1994 | Chan | 710/316 |
| 5,361,373 A | * 11/1994 | Gilson | 712/1 |
| 5,535,406 A | 7/1996 | Kolchinsky | |
| 5,574,942 A | * 11/1996 | Colwell et al. | 712/23 |
| 5,590,305 A | * 12/1996 | Terrill et al. | 711/103 |
| 5,646,544 A | * 7/1997 | Iadanza | 326/38 |
| 5,684,980 A | 11/1997 | Casselman | |
| 5,696,956 A | * 12/1997 | Razdan et al. | 712/23 |
| 5,717,853 A | * 2/1998 | Deshpande et al. | 709/222 |
| 5,787,007 A | * 7/1998 | Bauer | 716/16 |
| 6,065,122 A | * 5/2000 | Wunderlich et al. | 713/320 |

FOREIGN PATENT DOCUMENTS

| | | |
|---|---|---|
| EP | 0 497 029 | 8/1992 |
| EP | 0 759 662 | 2/1997 |
| GB | 2 286 737 | 8/1995 |
| GB | 2 304 438 | 3/1997 |
| WO | 94/14123 | 6/1994 |

OTHER PUBLICATIONS

TechEncyclopedia, Firmware's definition, TechWeb, http://www.techweb.com/encyclopedia/defineterm?term=firmware.*

M. Morris Mano, "Computer System Architecture", 1982, Prentice–Hall, Inc., 2nd ed., pp 159–161, 261–263, 434–443.*

* cited by examiner

Primary Examiner—Gopal C. Ray
Assistant Examiner—Justin I. King
(74) Attorney, Agent, or Firm—Meyertons Hood Kivlin Kowert & Goetzel, P.C.; B. Noël Kivlin

(57) ABSTRACT

A computer system comprising mass storage, a system bus connected to the mass storage, and a processor unit connected to the system bus. A library of standard functions is stored in the mass storage. Each library function is stored in at least one of two versions. The first version is obtained from compilation of firmware code, as is conventional. The second version is obtained from compilation of firmware code and comprises a set of configuration data for loading into a field programmable gate array (FPGA). The computer system is provided with a FPGA connected to the system bus which can be configured by the second versions of the library functions so that these can be performed in the FPGA, instead of in the processor. The apparatus and method are well suited to libraries of database search engine functions. Performance advantages can be obtained by executing function calls in the FPGA.

18 Claims, 7 Drawing Sheets

METHOD AND APPARATUS FOR EXECUTING STANDARD FUNCTIONS IN A COMPUTER SYSTEM USING A FIELD PROGRAMMABLE GATE ARRAY

BACKGROUND OF THE INVENTION

The invention relates to an apparatus and method for execution of standard functions in a computer system.

Past developments in computer systems to improve the execution speed of programs have seen the emergence of floating point numeric co-processors. These evolved due to the demand for repetitive calculations, typically in scientific applications where a number of complex trigonometric or floating point operations are required. In the early days of 8-bit processors, a square root function could take in the order of 5 milliseconds to execute. Floating point co-processors could perform this operation in around 1 microsecond, i.e. around 5000 times faster.

Recent developments have been aimed at speeding up more complex numeric functions, such as digital fourier transforms (DFT's). To perform such a complex numeric function, the processor may be required to perform many thousands of floating point applications. Processors designed to perform such complex numeric functions are generally referred to as digital signal processors (DSP's). The goal is to reduce the execution time to such an extent that real time operation can be achieved. Real time operation is highly desirable for applications such as image processing, holographic television and mobile telephone communication, for example.

With the focus on numeric and then DSP applications, some of the more mundane data processing functions have largely been ignored by hardware designers. The lack of interest in data processing functions can be understood by the fact that these functions do not consume as much processor time as numeric functions, such as the traditional square root function, or complex functions such as DFT's.

One example of a simple data processing function is a basic string search. The task is to find if a string such as "fred" appears in any of a number of other strings such as "rolling stones", "manfred mann" and "pink floyd", and if so where. The processor performs a byte-by-byte comparison of the first character in the required string "f" in the other strings until a match is found. The second character "r" is then compared with the next character of the string being compared, and so on. To perform the calculation, data is required to be loaded from system memory into the processor registers, interleaved with the processor instructions, also held in memory. The transactions on the system bus, the loading of internal processor registers and decision making are all executed in processor clock periods and represent a significant overhead of the string search function.

As databases become ever larger, repetitive applications of the simplest functions can be expected to consume increasing proportions of the total processor power, notwithstanding the fact that the functions individually are not computationally intensive. Imagine a database where many thousands of records have to be scanned for matching strings, or sorted into a different order.

It is thus an aim of the invention to provide a computer system in which standard functions, especially non-numeric functions such as those related to database applications, can be performed more efficiently than with conventional execution.

SUMMARY OF THE INVENTION

Particular and preferred aspects of the invention are set out in the accompanying independent and dependent claims. Features of the dependent claims may be combined with those of the independent claims as appropriate and in combinations other than those explicitly set out in the claims.

According to one aspect of the invention there is provided a computer system comprising a processor unit connected to a system bus, a mass storage medium including a library of functions, and a field programmable gate array (FPGA). The function library includes a number of functions stored in a pre-compiled form derived from compilation of firmware code and comprising a set of configuration data for configuring the field programmable gate array. The firmware code from which the pre-compiled form is derived may be written in a high-level description language (HDL). The FPGA has a set of configuration line connections operatively associated with the mass storage medium to allow configuration of the FPGA with the pre-compiled form of the function concerned. The FPGA also has a set of bus line connections operatively connected to communicate with the processor, for example through the system bus or a bus internal to the processor unit. The processor is operable to execute a call to one of said functions by delegating the principal data processing content of the function to the FPGA which is configured with the appropriate set of configuration data for that function. The function library may be held in system memory connected to the system bus, or held in an external device accessible through an I/O port of the computer system.

Returning to the example of a string search cited in the introduction, comparison of whole substrings can now take place in nanoseconds rather than hundreds of nanoseconds with a computer system based on current processor and FPGA technology. In the specific example from the introduction, the complete string "fred" could be compared concurrently against the first four characters "roll" in less than 10 nanoseconds. By comparison, with conventional software-based execution, four distinct load/compare cycles are required, consuming hundreds of nanoseconds of processor time.

An additional speed advantage is gained by the inherent parallelism of the high-level description languages (HDL's) used to write FPGA firmware. In this regard, most processors are essentially sequential devices and can only execute one instruction at a time. (Exceptions to this are parallel processors such as the Transputer). As a result, conventional hardware execution of a software function will in essence be a sequential process, even if pipelining is used to allow several instructions along an instruction stream to be worked on simultaneously. By contrast, HDL's are inherently parallel, allowing more than one command level function to be performed by the FPGA at the same time.

Referring once more to the string search described above. The string "fred" is searched for in the substring "manf" of "manfred mann". A byte-by-byte comparison indicates no match. At the same time, the first byte "f" of the string "fred" can be compared with every byte of "manf" to indicate where the rest of the search should begin, in this case at the fourth character. Both these operations can take place contemporaneously in the FPGA hardware. Incidentally, two redundant comparisons are also removed by this procedure, namely the search for a match between "f" (the first character of "fred") and each of "a" and "n" (the second and third characters of "manfred mann").

Thus, by transferring tasks from the processor to the FPGA, a change from sequential to parallel execution can be achieved. The processor is thus not only freed up for carrying out its other tasks, but the functions are executed more efficiently with parallelism.

Another significant advantage of the FPGA approach is that it allows retention of a level of flexibility comparable with conventional software-based execution. By contrast, transfer of numeric functions to a dedicated co-processor, or to specific integrated circuit portions of a DSP, sacrifices the flexibility of conventional software-based execution.

One way in which the inherent flexibility of the firmware approach can be exploited is as follows. Taking a library of standard functions as a starting point, the most time consuming standard functions can be committed to firmware first. Attention can then be directed to developing firmware versions of those functions that previously took seemingly insignificant amounts of processor time. The new firmware versions of the functions can then be added to existing computer systems, simply by supplying a ROM or other recording medium on which is stored the firmware representation of the standard function. The firmware for each function will principally include a set of configuration data for configuring an FPGA to perform the standard function in hardware. Alternatively, the new firmware versions can be supplied via a network, such as the Internet, i.e. in the form of a transmission medium.

Engineers familiar with FPGA design only have to sift through standard function libraries, for example C libraries, to identify those functions that can be readily converted into HDL for implementation in an FPGA. The selection process can be made having regard to the inherent complexity of the underlying algorithm and the specifications of the FPGA provided in hardware. More complex algorithms can be added to the firmware library as expertise in generating firmware versions of the standard library functions develops.

Another example of the benefit of flexibility is for correcting bugs. Firmware bugs in a library function are easily removed by issuing an upgraded firmware version of the library function. Firmware patches can thus be provided, as is usual in software patches. By contrast, the equivalent bugs in conventional hardware, for example in an ASIC (Application Specific Integrated Circuit) or a dedicated co-processor, are a significant risk, since they require costly NRE (non-recurring engineering) to respin the integrated circuit and expensive field replacement of assembled computer boards.

In summary, software versions of existing library functions can be converted to FPGA firmware versions in a piecemeal fashion. A succession of firmware library upgrades can be issued to users as and when firmware versions of more of the standard functions are developed, or as bugs in existing firmware functions are detected. At any one time, development can concentrate on those standard functions which are readily convertible into firmware and those standard functions that would provide the greatest incremental improvement in system performance if their execution were taken away from the processor and delegated to the FPGA.

Further aspects of the invention relate to a storage medium including a library of functions and methods of executing an instruction stream including calls to library functions.

In one such further aspect of the invention a storage medium is provided in or on which each of the functions in said library of functions is stored in at least one of a first version and a second version. The first version is in a form obtained from compilation of software code, and a second version is in a form obtained from compilation of firmware code and comprises a set of configuration data for loading into a field programmable gate array to configure the FPGA to perform the function concerned.

In another such further aspect of the invention there is provided a method of executing program flow liable to include calls to any one of a plurality of standard library functions. The function library is held in a storage medium as firmware comprising configuration data for a FPGA. The method comprises: detecting a call to a library function in the program flow; determining whether the FPGA is configured to execute that library function call; if the FPGA is not configured to execute that library function call, configuring the FPGA by loading the function's firmware into the FPGA from the storage medium; and executing the call using the FPGA configured with the library function.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
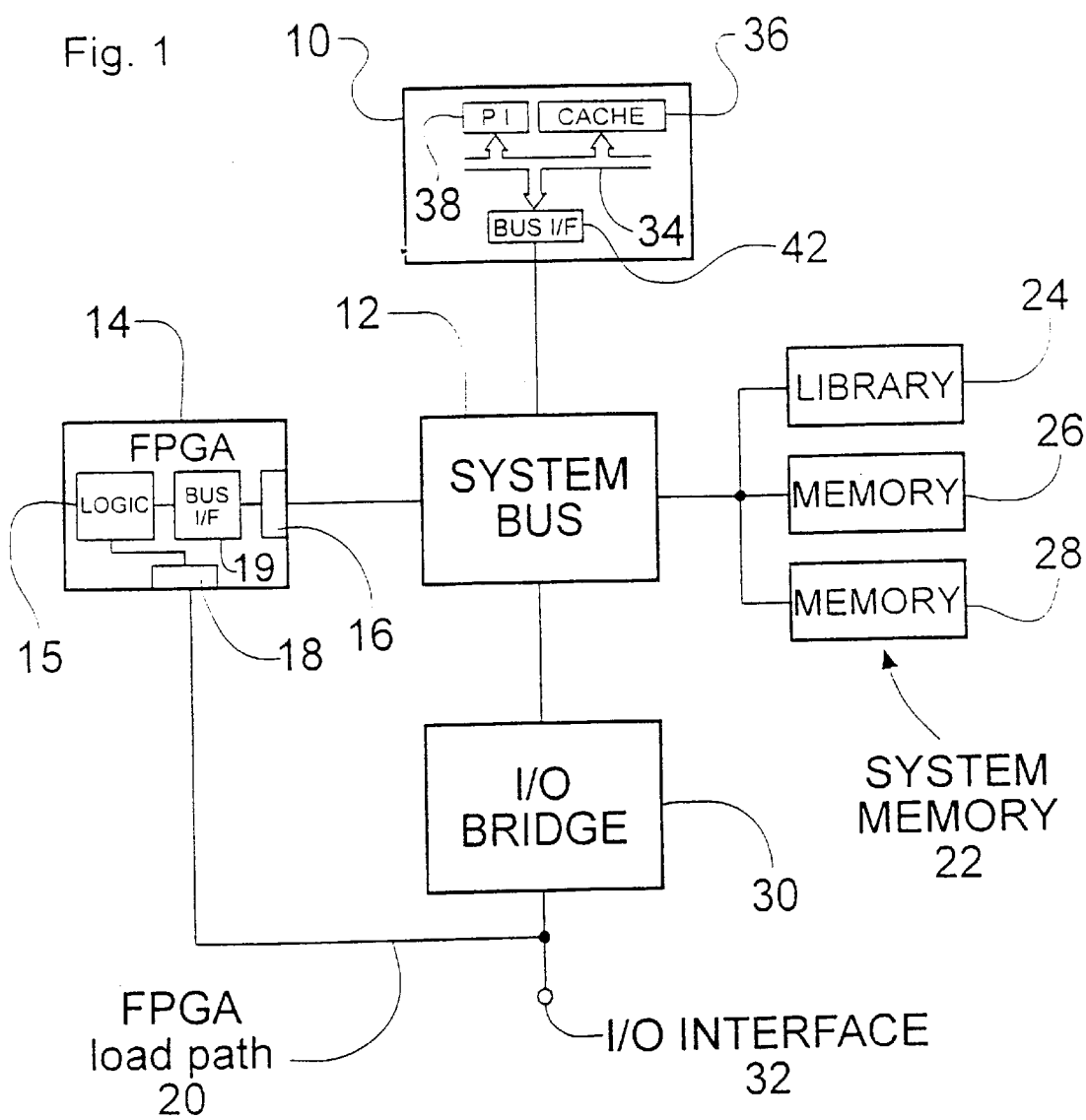
FIG. 1 is a block diagram of a computer system according to an embodiment of the invention including a field programmable gate array (FPGA) with configurable logic, and system memory including a portion in which is stored a library of standard functions.

FIG. 1 is a block diagram of a computer system according to a first embodiment of the invention. The system comprises a processor unit 10 connected to a system bus 12. The processor unit 10 also comprises a bus interface unit 42 which provides an interface between the system bus 12 and an internal bus 34 of the processor unit 10. The processor unit 10 includes a processor 38 and cache memory 36 for the processor 38. The processor 38 and cache 36 are connected to the processor's internal bus 34.

Mass storage comprising system memory 22 is connected to the system bus 12 and includes banks of general memory 26 and 28. The general memory 26 and 28 may for example be random access memory (RAM). The system memory 22 further comprises a memory portion 24 containing a library of standard functions which are pre-compiled versions of segments of code written in high-level computer languages. The memory 24 loaded with the library of standard functions may for example be mass storage in the form of read only memory (ROM), or some other form of non-volatile memory, or may be RAM or some other form of volatile memory.

The system further comprises an I/O bridge 30 having a first side connected to the system bus 12 and a second side connected to an I/O interface 32 into which external devices can be plugged or otherwise connected. The system also includes a field programmable gate array (FPGA) 14 which has a set of system bus line connections 16 connected to the system bus 12 and a set of configuration line connections 18 connected to the second side of the I/O bridge 30 through an FPGA load path 20. Internally, the FPGA includes an area of programmable logic 15 in the form of a gate array. The logic 15 is connected to the configuration line connections 18 so as to allow its configuration, and also to a system bus interface unit 19 which is arranged and internally configured to control access by devices connected to the system bus 12 to the logic 15.

One concrete implementation of the system of FIG. 1 is with a SPARC processor system manufactured by Sun Microsystems, Inc. In this case, the processor unit is a SPARC processor unit, the system bus a UPA (Universal Port Architecure) bus and the I/O bridge a PSYCHO unit, the block capitalized words being trademarks of Sun Microsystems, Inc.

Figure 2:
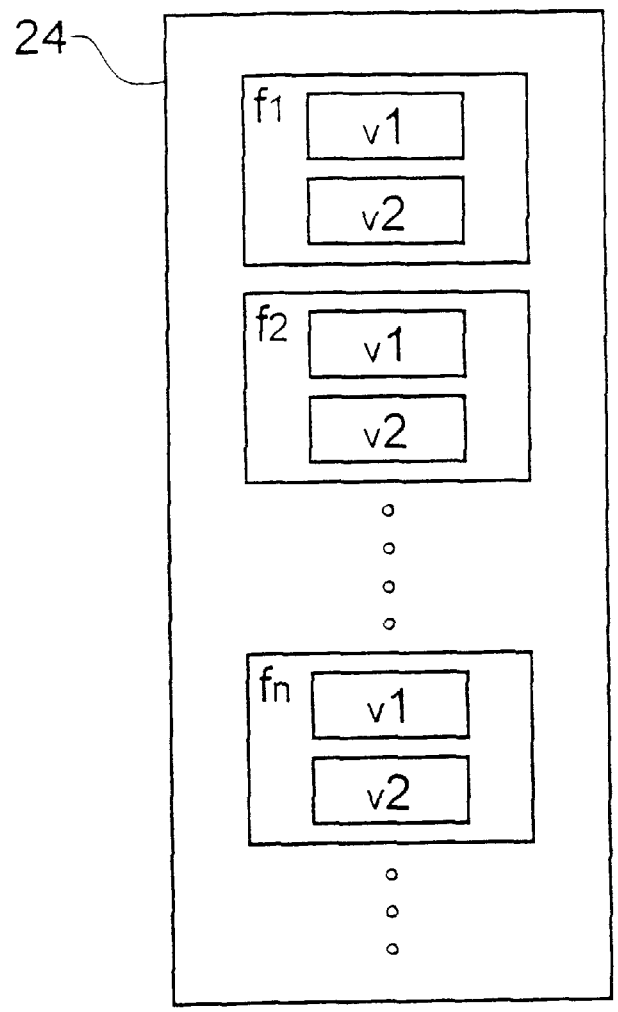
FIG. 2 shows internal structure of the library of the embodiment of FIG. 1.

FIG. 2 shows the library part 24 of the system memory 22 in more detail. The library includes a plurality of standard functions f1, f2, ..., fn, ... Each library function is stored in the memory 24 in two different versions, namely v1 and v2. The v1 versions are representations of an algorithm written in a high-level computer language, such as "C". The v2 versions are representations of an algorithm written in a high-level description language (HDL), such as VHDL (Very high speed integrated circuit HDL) or Verilog.

Version v1 is in standard form. Namely, version v1 is a pre-compiled version of the "C" algorithm, or algorithm written in some other high-level language. As is conventional, the pre-compiled functions in the library are added to the high level computer code when a computer program written in the same language is compiled. Version v1 of each library function thus allows the library function to be executed in traditional software.

Version v2 on the other hand is a pre-compiled version of the VHDL algorithm, or algorithm written in some other high-level description language. The pre-compiled form is essentially a set of FPGA configuration data, i.e. firmware which when loaded into an FPGA configures it to carry out the algorithm. In the present embodiment, the configuration data will be suitable for configuring the FPGA 14, more specifically its logic 15, so that a call to that library function can be carried out in the FPGA 14 by commands received from the system bus 12 by the bus interface unit 19.

Figure 3:
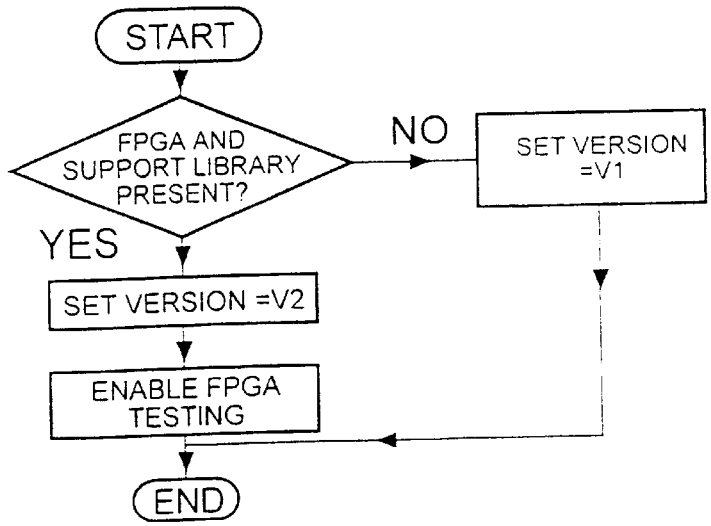
FIG. 3 is a flow diagram of a boot-up routine for the system of FIG. 1.

FIG. 3 shows a boot-up routine for the processor unit 10. The boot-up routine does not presuppose that an FPGA for supporting library functions is present. The boot-up routine tests for the presence of an FPGA and associated support in the form of appropriate versions of the functions, i.e. the v2 versions containing FPGA configuration data. If these components are not found, the version number of the library functions is set permanently to v1 in which case program calls to the library functions are carried out conventionally with the pre-compiled software versions v1 these functions. On the other hand, if an FPGA and associated support library is detected, the version number of the library functions is set initially to v2 and an additional parameter is set to enable FPGA testing during processor activity, for example during compilation. Incorporating a boot-up routine of this kind has the advantage that the processor and general system design can be generic, whether or not FPGA support for library functions is provided in any individual computer system. It is thus possible to offer FPGA library function support as an upgrade option, for example as a database search engine enhancement. The base hardware specification may or may not include a suitable FPGA. If not, the FPGA chip would be part of the upgrade.

Figure 4:
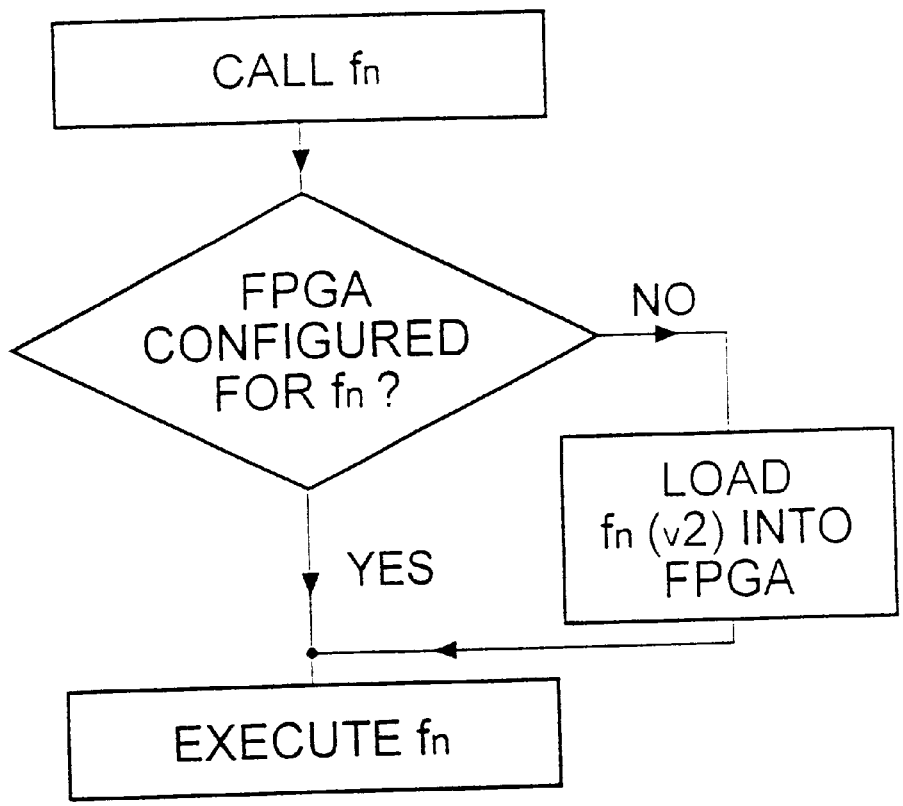
FIG. 4 is a flow diagram of a routine for calling and executing a function in the system of FIG. 1.

FIG. 4 shows system operation when a function call to a general library function 'fn' is made. When a function call occurs in the program code, a test is made to establish whether the FPGA is configured for the function that has been called. If the FPGA is not configured with the called function, then the configuration data for that function is loaded from the library 24 into the FPGA 14. The program flow then continues by execution of the called function once the FPGA has been configured to perform that function. On the other hand, if the FPGA is already configured for performing the called function, then the program flow proceeds directly to execution of the function in the FPGA.

Referring to the system hardware shown in FIG. 1, the FPGA 14 is configured through the load path 20 from the relatively slow bus interconnecting the I/O bridge 30 and I/O interface 32. This is for reasons of hardware compatibility, since the set of FPGA configuration line connections 18 may for example be 10-bit, similar to the I/O lines, whereas the main system bus 12 may be of much greater bandwidth, for example 64-bit.

To configure the FPGA logic 15 with a selected one of the library functions, the processor causes the pre-compiled firmware version of that function to be transmitted from the library 24, onto the system bus 12, through the I/O bridge 30, along the load path 20, and to the FPGA's configuration line connections 18.

Once the configuration data, i.e. the firmware, is loaded into the FPGA 14 through its configuration line connections 18, the logic 15 is configured. On completion of the configuration, the FPGA 14 notifies the loading hardware, i.e. the processing unit 10, by asserting a DONE signal onto the system bus 12, using the system bus interface 19.

An example of one specific library function is now described. The example function is a string search for the occurrence of one string in a second, larger string. The algorithm requires the processor to search through the second string until a match is found with the first character of the first string. When the first character is found, the algorithm then compares subsequent characters until a complete match is found. If no complete match is found, searching continues with the first character at the position subsequent to the position at which the searching of second and subsequent characters started. Appropriate FPGA registers of the hardware implementation are then loaded with the memory address of the string to be searched for, and the memory address of the string to be searched. The bus interface 19 of the FPGA 14 then negotiates for control of the main system bus 12 so that it can communicate with the system memory 22. The FPGA 14 then searches through the system memory 22 until a match is found, or the end of the second string is found. The result of the search is given in other FPGA registers of the hardware implementation, with the results being in a format that either indicates failure of the search or the start memory address at which the match was found.

During this search, continuous negotiation takes place between the FPGA 14, the processor unit 10 and any other devices requiring access to system memory 22. The execution of the search by the hardware implementation and the FPGA is quicker, because the hardware is only performing read cycles on the area of memory of interest. This is much faster than a standard technique in which the processor unit 10 is performing the string comparison operations, since, while performing the search operations, the processor unit also has to interleave fetch instructions from memory in order to perform a search, to deal with interrupts from other devices etc.

A feature specific to the system shown in FIG. 1, but not shared by some of the other embodiments described further below, is that the FPGA 14 is connected to the main system bus 12, rather than being an internal part of the processor unit 10, as would be normal for a numeric co-processor. By positioning the FPGA 14 as a device connected to the system bus 12, the FPGA 14 can communicate with the system memory 22 without direct participation of the processor unit 10. It is therefore possible for the FPGA 14 to access the system memory 22 during memory cycles which are not being used by the processor unit 10. For example, the FPGA 14 can access system memory 22 during redundant memory cycles between cache line fills, thereby utilizing system memory 22 while the processor 38 is using its cache 36 and has no demand for system bus bandwidth. Thus, by positioning the FPGA remote from, rather than proximate to, the processor 38 competition between the processor and FPGA for bus bandwidth on the processor's internal bus is avoided. Competition is limited to situations in which the processor generates high priority system bus traffic, e.g. as a result of cache misses.

Generally, it is considered preferable to arrange the FPGA to connect onto the system bus, rather than the processor's internal bus, for those functions that are intensive in memory accesses and which will not stall the processor pending a result being returned. The arrangement of FIG. 1 is thus ideally suited for database search engine functions such as search and sort functions. Moreover, the arrangement of FIG. 1 is especially compatible with a pipeline processor with a relatively long pipeline, so that calls to search and sort functions, for example, can be initiated at an early pipeline stage, such as a dedicated additional pre-fetch stage.

Figure 5:
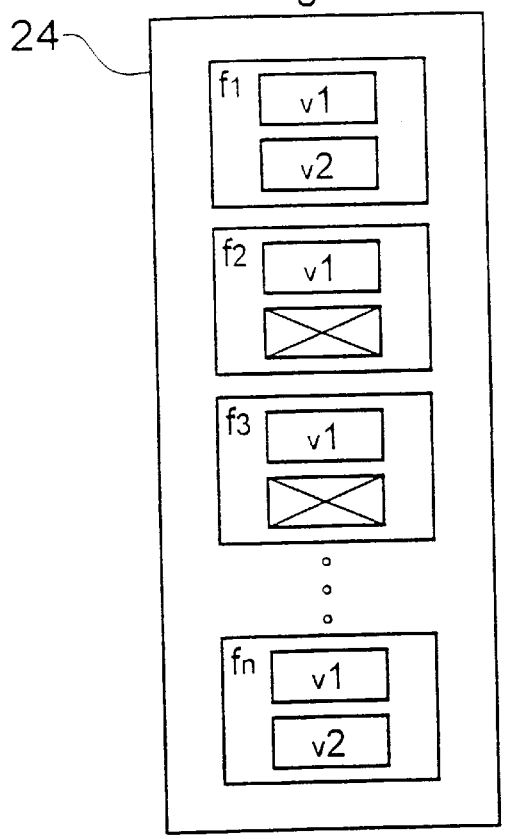
FIG. 5 shows internal structure of the library of the embodiment of FIG. 1 in an alternative form to that shown in FIG. 2.
Figure 6:
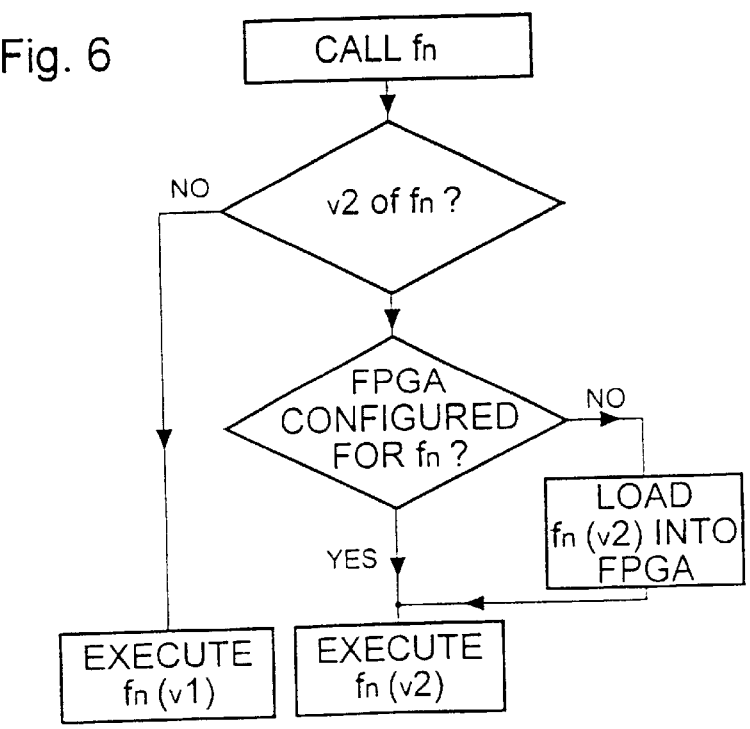
FIG. 6 is a flow diagram of a routine for calling and executing a function with a library structure as shown in FIG. 5.

FIGS. 5 and 6 show a variation of the above-described embodiment. In this variant, FIGS. 5 and 6 replace FIGS. 2 and 4 and associated text. The library of functions stored in the memory 24 contains version v1 representations of all the library functions, but version v2 representations of only some of the functions. The absence of a v2 representation is indicated by a crossed box in FIG. 5. This may be the case when the FPGA logic 15 has an insufficient gate count to allow configuration with all of the library functions, in which case only the logically simpler ones can be implemented. Other factors may also dictate which functions are only provided in conventional v1 format.

FIG. 6 shows system operation in the variant of FIG. 5 when a function call to a general library function 'fn' is made. When a function call occurs in the program code, a test is made to establish whether a v2 representation of that function exists in memory 24. If not, then execution proceeds conventionally with the v1 version, i.e. in software. On the other hand, if a v2 representation is present, a further test is made to establish whether the FPGA is configured for the function that has been called. If the FPGA is not configured with the called function, then the configuration data for that function is loaded from the library 24 into the FPGA 14. The program flow then continues by execution of the called function in the FPGA, i.e. in hardware, once the FPGA has been configured to perform that function and the DONE signal asserted on the system bus 12. On the other hand, if the FPGA is already configured for performing the called function, then the program flow proceeds directly to execution of the function in the FPGA.

Figure 7:
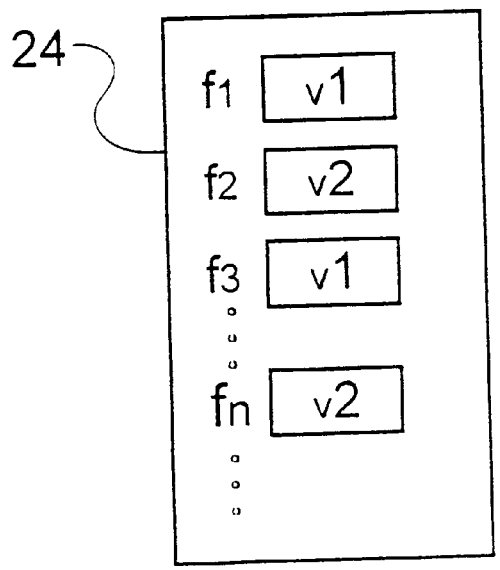
FIG. 7 shows internal structure of a further variant of the library, suitable for use with the embodiment of FIG. 1.

FIG. 7 shows a further variant of the library memory 24 in which each library function is only provided in one version, either a v1 version or a v2 version. A system with this variant of memory 24 can utilize the routine of FIG. 6.

Figure 8:
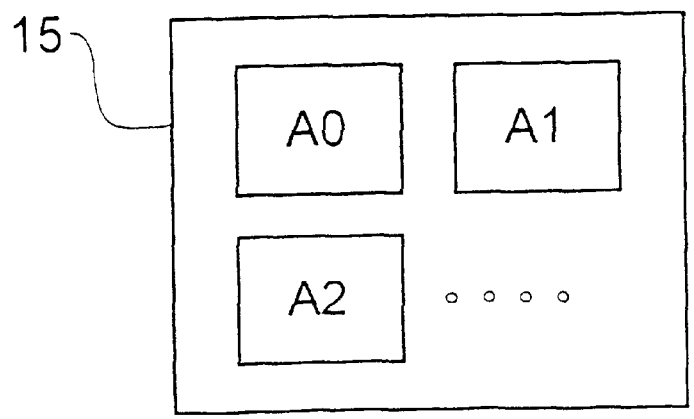
FIG. 8 shows internal structure of the configurable logic of the FPGA of FIG. 1, the logic having multiple independently configurable gate groups.

FIG. 8 shows internal structure of the FPGA's configurable logic 15 in an alternative embodiment. In this embodiment the configurable logic 15 is sub-divided into a plurality of 'm' independently configurable areas A0, A1 ... Ai, ... A(m−1). These areas are not only independently configurable, but are also independently addressable by the bus interface 19 so that each area can support a separate library function.

Figure 9:
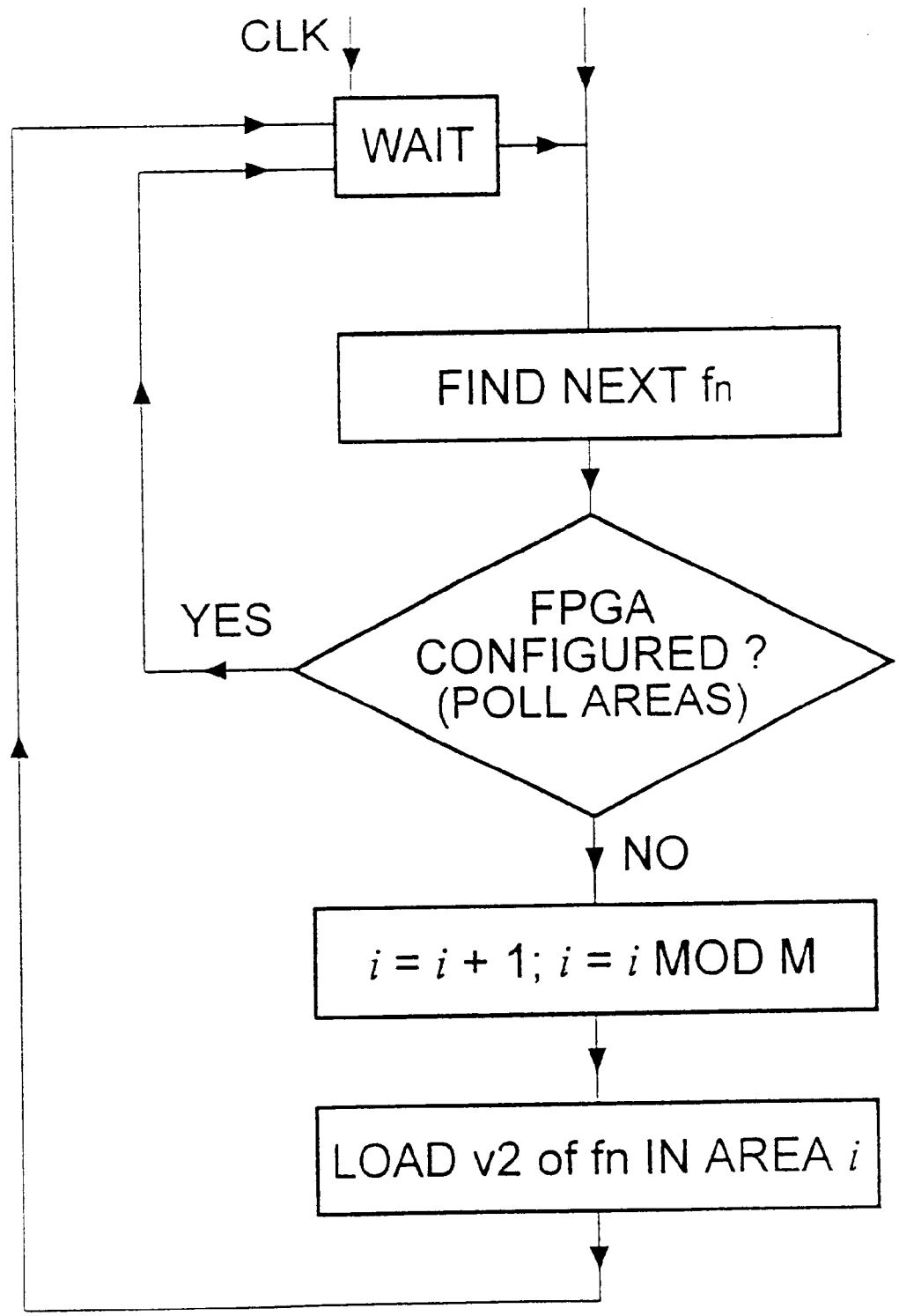
FIG. 9 is a flow diagram of a routine running in background for pre-fetching configuration data into the FPGA for function calls lying ahead in the instruction stream.

FIG. 9 is a flow diagram of a processor routine for running in the background of code execution with a multi-area FPGA of the kind shown in FIG. 8. The background routine could, for example, be executed in a pre-fetch pipeline stage, as mentioned above. The background routine locates in the program code the next library function call in the instruction stream. A test is then performed to establish whether an area An of the FPGA logic is already configured to support this library function. This test could be implemented by polling the FPGA, the FPGA having relocatable FPGA firmware providing this function. Alternatively, this test could be implemented by referring to an FPGA configuration state list maintained in the processor unit 10, for example.

If the FPGA is already configured to support the function, then the routine returns to find the next library function call. The return line may incorporate a wait state that is externally triggered by a signal CLK before proceeding to find the next function call. The external trigger could, for example, be responsive to each execution of a library function call.

On the other hand, if the FPGA is not configured to support the function, then an integer count value i is incremented, i=i+1, and then subjected to a modulus function i=i MOD M, where M is the total number of independent logic areas in the FPGA. The routine then proceeds by loading the appropriate configuration data, i.e. v2 of the called function 'fn' into area 'Ai' of the configurable logic 15.

The background routine then returns to find the next library function call in the instruction stream. Again this may be through an externally clocked wait state, as described above and illustrated in FIG. 9.

In this way, multiple areas of configurable logic are used in conjunction with appropriate processor operating routines to configure the FPGA hardware ahead of library function calls, thereby reducing latency caused by FPGA configuration. Provision of FPGA's with multiple FPGA areas will be particularly useful in conjunction with processors having parallel processing architecture that supports speculative branching. Different library function calls in respective different speculative branches of the instruction stream can then be handled more efficiently without a thrashing effect in the FPGA configuration, analogous to the familiar thrashing effect in caches.

If the FPGA and its access protocols are configured to allow functions to run in parallel on two or more areas of the FPGA, then the FPGA firmware and access protocols need to maintain data coherence. Data coherence is maintained by ensuring that data modified by one function is not modified by the other during the multi-tasking. Standard software programming techniques can be used to meet this requirement. Similar comments apply if one function is allowed to run in the FPGA (v2 implementation) while another is running in software (v1 implementation).

If a plurality of independently configurable FPGA areas 'An' are provided, these can be configured as part of the boot-up procedure. This would be especially useful if a large number of independently configurable FPGA areas 'An' is provided. If the number of areas 'An' is larger than the number of v2 versions of library functions, then the boot-up procedure can simply involve loading all of the v2 versions into respective areas 'An' of the FPGA. More typically, however, there will be more v2 versions than independently configurable FPGA areas. To take account of this case, the library, or some other part of non-volatile memory or mass storage, is provided with a history file, for example a history table or list. The history file stores data on the frequency with which the different v2 versions have been executed by the system during recent operation. For example, a history table can be maintained which stores the most frequently used v2 version library functions. The boot-up procedure then includes a routine which loads the 'm' independently configurable FPGA areas A0, A1 . . . An . . . A(m−1) with the 'm' most frequently used v2 library functions.

Figure 10:
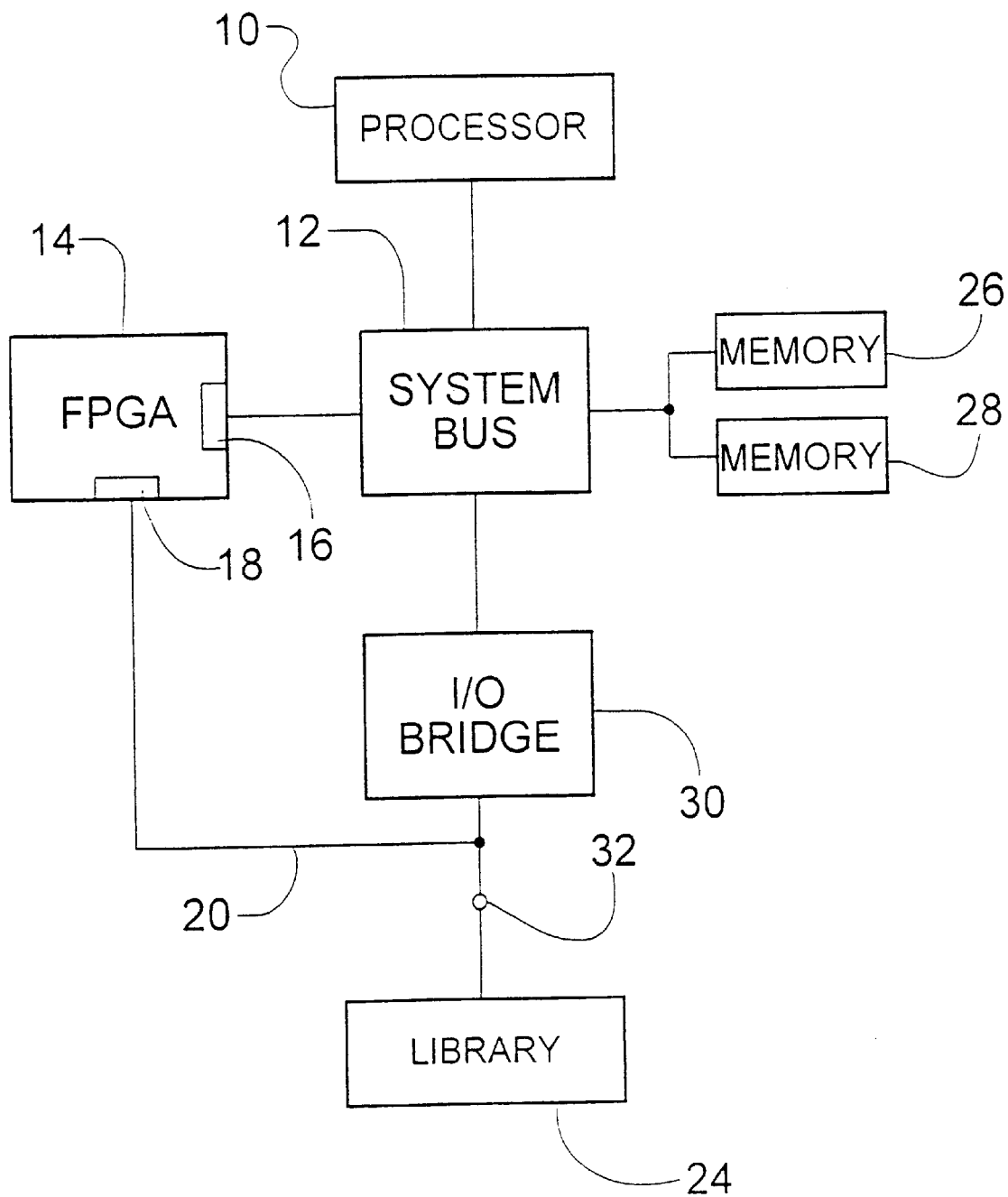
FIG. 10 is a block diagram of a computer system according to an alternative embodiment of the invention.

FIG. 10 shows an alternative system architecture to that of FIG. 1. In the embodiment of FIG. 10, there is provided a processor unit 10, system bus 12, FPGA 14, general purpose memory 26 and 28, and I/O bridge 30, all arranged in a manner that is similar to the embodiment of FIG. 1. Further description of these components and their interconnections is omitted here for the sake of brevity.

The embodiment of FIG. 10 differs from that of FIG. 1 in that the library of standard functions is held in a mass storage medium 24 plugged in to the system as an external device through the I/O interface 32. Operationally, this arrangement differs from that of FIG. 1 in the way in which the FPGA 14 is configured. (The way in which the processor unit 10 accesses the FPGA 14 through the bus line connections 16 remains the same). FPGA configuration instructions from the processor unit 10 are routed though the I/O bridge 30 to the external library device 24. Responsive to a configuration instruction, the external library device transmits configuration data to the I/O interface. The configuration data is then routed along the load path 20 to the FPGA configuration line connections 18, so that configuration then proceeds conventionally, i.e. in the same way as for the embodiment of FIG. 1.

This embodiment has the advantage of convenience in that the library of standard functions an be carried in a plug-in card, CD-ROM or any other form of magnetic or optical recording medium. More fundamentally, with this embodiment, configuration data traffic is removed from the system bus, so that the design is simplified in that negotiation protocols for accessing system memory by the FPGA and processor unit are not required. Program execution can proceed more rapidly, especially if cache size is relatively small, or the applications of interest otherwise tend to result in a high proportion of cache misses by the processor. (The advantage of the embodiment of FIG. 1 is also retained, since there is no competition on the processor's internal bus between the FPGA and the processor).

Figure 11:
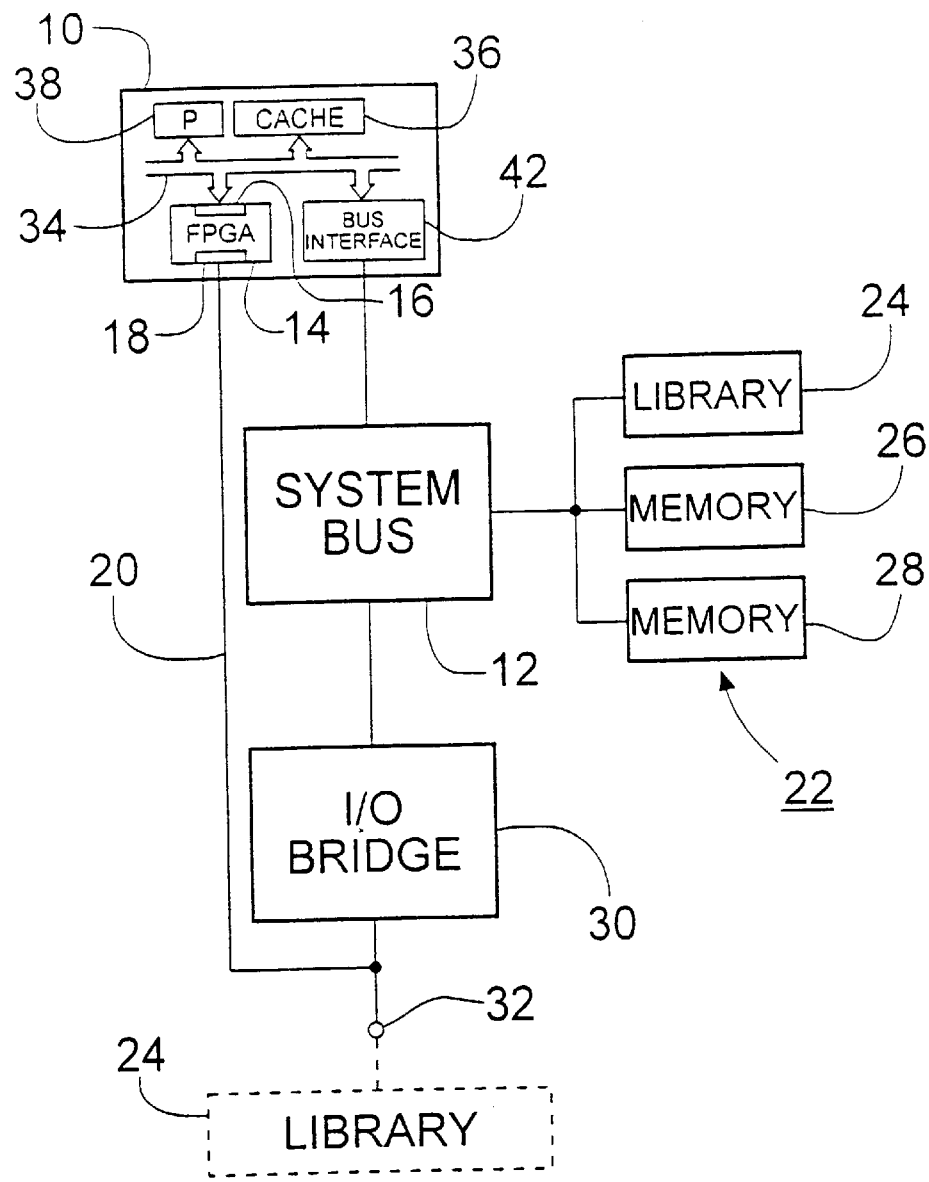
FIG. 11 is a block diagram of a computer system according to a further alternative embodiment of the invention.

FIG. 11 shows another alternative system architecture to that of FIG. 1. In the embodiment of FIG. 11, there is provided a processor unit 10, system bus 12, system memory 22, and I/O bridge 30, all arranged in a manner that is similar to the embodiment of FIG. 1. Further description of these components and their interconnections is omitted here for the sake of brevity.

The embodiment of FIG. 11 differs from that of FIG. 1 in that the FPGA 14 is arranged as part of the processor unit 10 connected to the internal bus 34 of the processor unit by its bus line connections 16. A processor 38 is illustrated. The configuration line connections 18 of the FPGA 14 are connected in a similar manner to the embodiment of FIG. 1, that is to the output side of the I/O bridge 30 using a load path 20. This embodiment does not have some of the above-described advantages of the embodiments of FIGS. 1 and 10, since the FPGA 14 will compete with the processor 38 for memory access, both in the case of the shared cache 36 and system memory 22. However, the embodiment of FIG. 11 has the advantages that processor access times to the FPGA will be much faster, and that memory access times by the FPGA will also be much faster, because the cache 36 is accessible to the FPGA. In a variant, the FPGA could be provided with a dedicated cache, separate from the processor cache. This embodiment is expected to be preferable for implementation of library functions that are not intensive in terms of memory accesses. Processor bus bandwidth is not likely to limit performance for such functions. Further, this embodiment is also expected to be preferable for library functions that tend to execute in a relatively short number of instructions, such as is the case for some numerically intensive functions, for example time/date conversion functions. A typical time/date conversion function will convert between a 32 bit integer and year, month, day, hour, minute, second and associated time difference calculations. In these cases, it will be beneficial to reduce the latency associated with processor calls to the FPGA, since this time will be a significant component of the total time for function call completion.

In a variant of the embodiment of FIG. 11, the library 24 may be plugged in as an external device, as shown by the dashed lines in the illustration, similar to the embodiment of FIG. 10.

Moreover, it will be understood that the embodiment of FIG. 11 can be combined with the embodiment of FIG. 1 or FIG. 10. In these combined embodiments, two FPGA's are provided, one connected to the internal processor bus and another to the main system bus, optionally through an I/O port. The v2 function versions can then be classified into two groups, one group for executing on the FPGA that is connected proximate to the processor and the other group for executing on the FPGA that is connected remote from the processor. The classification would follow the considerations outlined above, with short and numerically intensive functions being allocated to the processor-proximate FPGA and search and sort functions to the processor-remote FPGA.

Figure 12:
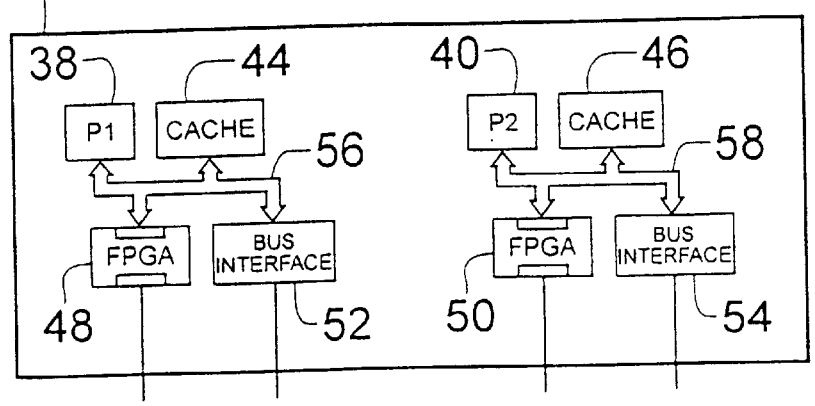
FIG. 12 is a block diagram of a processor unit of a computer system according to another embodiment of the invention.

FIG. 12 shows a processor unit according to a further alternative system architecture. The processor unit 10 comprises two processor clusters each with its processor 38 and 40, cache 44 and 46, FPGA 48 and 50, and bus interface 52 and 54 respectively. The components of each cluster are connected to respective cluster buses 56 and 58. The processor unit outputs from the bus interfaces are connected to a system bus 12. The processor unit outputs from the configuration line connections of the FPGA's 48 and 50 lead to a load path 20 connected as shown in FIG. 11. Other aspects of the system architecture of this embodiment are as described above with reference to the embodiment of FIG. 11.

In the architecture of FIG. 12, an FPGA is provided for each processor, for example on a plug-in processor module. An operating system is provided that allows a particular process to bound to a specified processor. As an example, all string search processes can be bound to the processor of one cluster or module and its associated FPGA, whereas all sort processes could be bound to another cluster or module. Each processor's FPGA would then be loaded with different hardware functions to distribute the computing load.

It will be appreciated that although particular embodiments of the invention have been described, many modifications/additions and/or substitutions may be made within the spirit and scope of the present invention.

What is claimed is:

1. A computer system comprising:
 (a) a mass storage medium including a library of functions at least some of which are stored in pre-compiled firmware forms each comprising configuration data;
 (b) a field programmable gate array (FPGA) including a set of bus line connections, and a set of configuration line connections operatively associated with the mass storage medium to allow configuration of the FPGA with the pre-compiled firmware forms of the functions from the mass storage medium; and
 (c) a processor unit comprising a processor operatively associated with the FPGA through the set of bus line connections thereof and operable to execute a call to a given one of said functions, wherein the processor unit is operable to determine whether a pre-compiled firmware form of the given function is available;
  wherein the processing unit is further operable to use the FPGA configured with the pre-compiled firmware form of the given function in response to determining that the pre-compiled firmware form of the given function is available;
  wherein the processing unit is further operable to use a software form of the given function in response to determining that the pre-compiled firmware form of the given function is not available.

2. The system of claim 1, further including:
 a system bus to which is connected the mass storage medium, the FPGA through the set of bus line connections thereof, and the processor unit;
 an I/O bridge having a first side connected to the system bus and a second side connected to an I/O interface; and
 a load path interconnecting the set of configuration line connections of the FPGA and the second side of the I/O bridge;
 wherein the processor is operable to configure the FPGA with the given one of the library functions by causing the pre-compiled firmware form of the given function to be transmitted from the mass storage medium, onto the system bus, through the I/O bridge, along the load path, and to the configuration line connections of the FPGA.

3. The system of claim 1, further including:
 a system bus to which is connected the mass storage medium and the processor unit;
 an I/O bridge having a first side connected to the system bus and a second side connected to an I/O interface;
 a load path interconnecting the set of configuration line connections of the FPGA and the second side of the I/O bridge; and
 an external device, of which the mass storage medium forms at least a part, arranged connected to the I/O interface;
 wherein the processor is operable to configure the FPGA with the given one of the library functions by causing the pre-compiled firmware form of the given function to be transmitted from the mass storage medium, to the I/O bridge, along the load path, and to the configuration line connections of the FPGA.

4. The system of claim 1, further including:
 a system bus to which is connected the processor unit;
 an I/O bridge having a first side connected to the system bus and a second side connected to an I/O interface;
 a load path interconnecting the set of configuration line connections of the FPGA and the second side of the I/O bridge;
 wherein the processor unit further comprises an internal bus to which is connected the processor, the field programmable gate array, through the set of bus line connections thereof, and a bus interface having a first side connected to the internal bus of the processor unit and a second side connected to the system bus.

5. The system of claim 4:
 wherein the mass storage medium is connected to the system bus; and
 wherein the processor is operable to configure the FPGA with the given one of the library functions by causing the pre-compiled firmware form of the given function to be transmitted from the mass storage medium, onto the system bus, through the I/O bridge, along the load path, and to the configuration line connections of the FPGA.

6. The system of claim 4, further including:
 an external device, of which the mass storage medium forms at least a part, arranged connected to the I/O interface;
 wherein the processor is operable to configure the FPGA with the given one of the library functions by causing the pre-compiled firmware form of the given function to be transmitted from the mass storage medium, to the I/O bridge, along the load path, and to the configuration line connections of the FPGA.

7. The system of claim 1, wherein the FPGA comprises a plurality of independently addressable areas, each configurable with one of the library functions.

8. The system of claim 7, there being one independently addressable area for each library function stored in the mass storage medium, the system having a boot-up routine for configuring the FPGA with each of the library functions.

9. The system of claim 1, wherein the pre-compiled firmware form is derived from compilation of firmware code.

10. The system of claim 9, wherein the firmware code from which the pre-compiled firmware form is derived is written in a high-level description language (HDL).

11. The system of claim 1, wherein each of the functions in said library of functions is stored in at least one of a first version and a second version, the first version being pre-compiled from software code, and the second version being pre-compiled from firmware code.

12. The system of claim 1, wherein the library of functions comprises at least one of a search function, a string search function and a sort function.

13. The system of claim 1, wherein at least a sub-group of said functions is for supporting a database search engine.

14. A method of executing program flow including calls to any one of a plurality of library functions at least some of which are held in a storage medium as firmware comprising configuration data for a field programmable gate array (FPGA), the method comprising:

detecting a call to a particular library function in the program flow;

determining whether the firmware for executing the particular library function is held in the storage medium;

determining whether the FPGA is configured to execute the particular library function call;

in response to determining that the firmware for executing the particular library function is held in the storage medium and that the FPGA is not configured to execute the particular library function call, configuring the FPGA by loading the firmware for executing the particular library function into the FPGA from the storage medium, and executing the call to the particular library function using the FPGA configured with the library function;

executing the call to the particular library function using a software form of the particular library function in response to determining that the firmware form for executing the particular library function is not held in the storage medium.

15. The method of claim 14, wherein the FPGA is operable to be configured with only one of the library functions at any one time, the FPGA being reconfigured each time a call to a different library function is made.

16. The method of claim 14, wherein the FPGA has at least a first area and a second area to allow simultaneous configuration of the FPGA with at least two library functions, so that, while executing one call using a first library function embedded in the first area of the FPGA, the method further comprises:

detecting a subsequent call in the program flow to a second library function; and configuring the second area of the FPGA by loading the second library function into the FPGA from the storage medium.

17. The method of claim 14, wherein the FPGA has at least a first area and a second area to allow simultaneous configuration of the FPGA with at least two library functions, the method further comprising:

configuring at least the first and second areas of the FPGA with respective ones of the library functions and executing multiple library function calls in parallel.

18. A method of executing a program flow including calls to any one of a plurality of library functions held in a storage medium as firmware, wherein each of the functions in said library of functions is stored in at least one of a first version and a second version, the first version being pre-compiled from software code, and the second version being pre-compiled from firmware code, the method comprising:

detecting a call to a particular library function in the program flow;

testing for presence of a field programmable gate array (FPGA) hardware capable of supporting that call;

testing for presence of the second version of the called function;

absent the FPGA hardware or said second version, executing the call in software using the first version of the particular library function; and present the FPGA hardware and said second version, loading the FPGA with the second version of the particular library function and executing the call in hardware using the FPGA.

* * * * *